United States Patent
West et al.

(10) Patent No.: US 10,749,258 B1
(45) Date of Patent: Aug. 18, 2020

(54) ANTENNA SYSTEM AND METHOD FOR A DIGITALLY BEAM FORMED INTERSECTING FAN BEAM

(71) Applicant: Rockwell Collins, Inc., Cedar Rapids, IA (US)

(72) Inventors: James B. West, Cedar Rapids, IA (US); Peter M. Sahayda, Cedar Rapids, IA (US); Ted J. Hoffmann, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/147,263

(22) Filed: Sep. 28, 2018

(51) Int. Cl.
*H01Q 3/38* (2006.01)
*H04B 7/06* (2006.01)
*H04B 7/08* (2006.01)
*H01Q 21/06* (2006.01)
*H01Q 3/26* (2006.01)
*H01Q 21/00* (2006.01)

(52) U.S. Cl.
CPC ........... *H01Q 3/385* (2013.01); *H01Q 3/2694* (2013.01); *H01Q 21/061* (2013.01); *H04B 7/0617* (2013.01); *H04B 7/0691* (2013.01); *H04B 7/086* (2013.01); *H04B 7/0874* (2013.01); *H01Q 21/0025* (2013.01)

(58) Field of Classification Search
CPC .... H01Q 3/385; H01Q 21/061; H01Q 3/2694; H01Q 21/0025; H04B 7/0691; H04B 7/086; H04B 7/0617; H04B 7/0874
See application file for complete search history.

(56) References Cited

U.S. PATENT DOCUMENTS

| | | | |
|---|---|---|---|
| 4,626,858 A * | 12/1986 | Copeland | H01Q 25/002 342/363 |
| 8,903,342 B1 | 12/2014 | Wyse et al. | |
| 8,907,817 B1 | 12/2014 | Finley et al. | |
| 9,041,587 B2 * | 5/2015 | Longstaff | G01S 13/913 342/33 |
| 9,116,224 B2 | 8/2015 | Kishinami et al. | |
| 9,478,858 B1 | 10/2016 | West et al. | |
| 9,537,529 B2 * | 1/2017 | Hayashi | H04B 1/40 |
| 9,653,820 B1 | 5/2017 | West et al. | |
| 9,667,235 B1 | 5/2017 | Wyse et al. | |
| 9,735,469 B1 | 8/2017 | West et al. | |

(Continued)

OTHER PUBLICATIONS

U.S. Appl. No. 16/146,349, filed Sep. 28, 2018, West et al.
U.S. Appl. No. 14/300,021, filed Jun. 9, 2014, West et al.

*Primary Examiner* — Vineeta S Panwalkar
(74) *Attorney, Agent, or Firm* — Suiter Swantz pc llo (57) ABSTRACT

An antenna system and method use an electronically-scanned antenna array and a hybrid beam former architecture. The antenna system includes a matrix of antenna elements and a feeder network. The feeder network includes a first layer including phase shifters. Each of the phase shifters is for a respective antenna element of the antenna elements. The feeder network also includes a second layer and a third layer. Each of the first set of the first time delay units in the second layer is for a respective first subarray of the first subarrays of the antenna elements. Each of the second set of the second time delay units in the third layer is for a respective second subarray of the second subarrays of the first subarrays.

25 Claims, 9 Drawing Sheets

(56) References Cited

U.S. PATENT DOCUMENTS

2010/0141527 A1* 6/2010 Lalezari ............... H01Q 21/08
                                                    342/368
2017/0353338 A1* 12/2017 Amadjikpe .......... H01Q 9/0407

* cited by examiner

ANTENNA SYSTEM AND METHOD FOR A DIGITALLY BEAM FORMED INTERSECTING FAN BEAM

BACKGROUND

Embodiments of inventive concepts disclosed herein relate generally to antenna systems including but not limited to antenna systems for providing an intersecting fan beam.

Modern sensing and communication systems may utilize various types of antennas to provide a variety of functions, such as communication, radar, and sensing functions. For example, ultra-high frequency (UHF) and very high frequency (VHF) radio systems use directional and omnidirectional antenna arrays for data and voice communication. In another example, radar systems use antenna arrays to perform functions including but not limited to: sensing, intelligence-gathering (e.g., signals intelligence, or SIGINT), direction finding (DF), electronic countermeasure (ECM) or self-protection (ESP), electronic support (ES), electronic attack (EA) and the like. An antenna system that supports multiple, independently steered beams is desirable for military and commercial radio frequency (RF) sensor systems. Electrically large, multiple, independently steered, analog beam formers (ABF), that steer the beam of an active electronically scanned array (AESA) are challenging to implement in hardware due to the physical structure of multiple parallel banks of feed manifolds/phase shifters or ultra wide band (UWB) time delay units that are required for each beam. Electrically large, multiple, independently steered, digital beam formers (DBF) require large amounts of direct current (DC) power.

SUMMARY

In one aspect, embodiments of the inventive concepts disclosed herein are directed to an antenna system for an intersecting fan beam. The antenna system includes a first linear array and a second linear array. The first linear array is orthogonal to the second linear array and has the same polarization characteristic of the second linear array. The antenna system also includes a first beam former coupled to the first linear array, a second beam former coupled to the second linear array, and a processor configured to effect the intersecting fan beam.

In a further aspect, embodiments of the inventive concepts disclosed herein are directed to an antenna system for a digitally beam formed intersecting fan beam. The antenna system includes a beam steering computer, a first array, and a second array. The first array is orthogonal to the second array. The antenna system also includes a first beam former coupled to the first array and the beam steering computer, and a second beam former coupled to the second array and the beam steering computer. The beam steering computer coherently combines data from the first beam former and the second beam former for formation of the digitally beam formed intersecting fan beam.

In a further aspect, embodiments of the inventive concepts disclosed herein are directed to a method of forming crossed fan beams. The method includes providing first phase shift commands to a first digital beam former for a first linear array of first antenna elements, and providing second phase shift commands to a second digital beam former for a second linear array of second antenna elements. The first linear array is orthogonal to the second linear array. The method also includes coherently processing data from the first digital beam former and the second digital beam former to obtain an intersecting fan beam response.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or maybe represented schematically in the interest of clarity. Like reference numerals in the drawings may represent and refer to the same or similar element, feature, or function. In the drawings.

DETAILED DESCRIPTION

Before describing in detail some embodiments of the inventive concepts disclosed herein, it should be observed that the inventive concepts disclosed herein include, but are not limited to a novel structural combination of components and circuits disclosed herein, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

Some embodiments of the inventive concepts disclosed herein are directed to systems and methods that independently steer multiple beams using digital beam forming that can be implemented without being significantly limited by size, weight, power and cost (SWAP-C) considerations. In some embodiments, two orthogonal linear array hybrid digital beam formers (HDBFs) of the same polarization synthetically produce an equivalent two-dimensional directional beam at a given center frequency and instantaneous beam width via digital signal processing techniques. In some embodiments, the architecture reduces an M*N HDBF channel count of a conventional (row by column) array to a channel count of M+N HDBF channel count wherein N and M are integers. In some embodiments, for a synthetically produced square aperture, the channel count is reduced to a 2*M channel count from an M*M channel count for a conventional square aperture which is an order of magnitude in HDBF channel reduction. In some embodiments, additional orthogonal linear arrays (e.g., arbitrarily expandable) for spectral diversity are provided (e.g., two frequency bands using two distinct horizontal linear arrays and two distinct vertical linear arrays and three frequency bands using three distinct three horizontal linear arrays and three distinct vertical linear arrays). In some embodiments, miniature tunable filters or miniature 3D microfabricated tunable filters (e.g., Z-Fab filters manufactured by Rockwell Collins, Inc.) at each HDBF channel input provide electromagnetic interference (EMI) suppression at an element level for a HDBF AESA.

In some embodiments, the antenna system and method uses sub-bands performing in the 2-18 GHz range and provides up to 1000 MHz (1 GHz) instantaneous bandwidth, although other bandwidths and frequency ranges can be utilized. In some embodiments, the antenna system is comprised of a planar subarray panel of generalized perimeter contours with commensurate arrays, HDBF modules and application specific transmit receive modules (ASTRMs) to create piece-wise planar approximations to double and singly curved aperture surface for conformal applications. In some embodiments, a spectral agile two-way communication link is provided using two antenna systems, where a first vehicle transmits at a frequency f1 and a second vehicle receives at a frequency f1, and the second vehicle transmits at the frequency f2 and the first vehicle receives at the frequency f2. The systems and methods operate both within the intermediate frequency (IF) bandwidth of one subarray and across subarrays to enable large frequency separation which is controlled dynamically through computer control in some embodiments.

Figure 1:
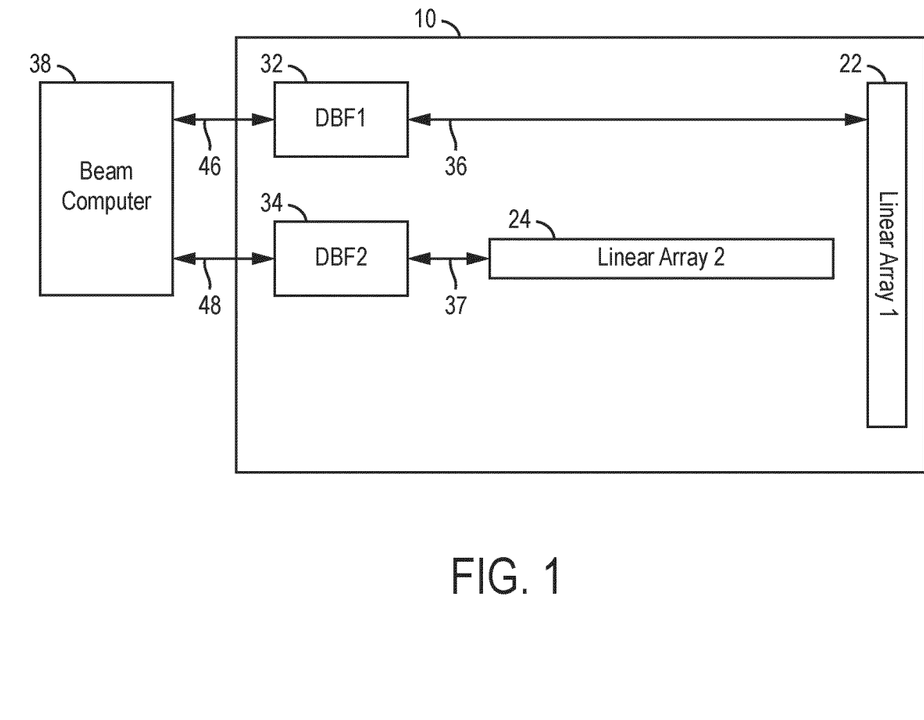
FIG. 1 is a general block diagram of an antenna system according to exemplary aspects of the inventive concepts disclosed herein.

Referring to FIG. 1, an antenna system 10 for a communication, radar, or sensing system includes an antenna array 22, an antenna array 24, a beam former 32, a beam former 34, and a beam computer 38. The beam formers 32 and 34 are coupled to the beam computer 38. The beam formers 32 and 34 are coupled respectively to the arrays 22 and 24.

In some embodiments, the antenna system 10 is for a sensing radar system or electronic warfare radar system. The antenna system 10 can be or can be part of a sensing system, radar system, and communication system. In one embodiment, antenna system 10 can be part of an electronic intelligence (ELINT) receiver, an electronic countermeasure (ECM) system, an electronic support measure (ESM) system, and/or hybrids thereof. The antenna system 10 includes antenna elements in the antenna arrays 22 and 24 configured or a 15-60 gigahertz operation using miniature and high density RFIC packaging and interconnects appropriate for 60 GHz half wavelength in some embodiments. The antenna system 10 provides up to 1 GHz instantaneous bandwidth and is configured steer intersecting RF fan beams associated with the antenna array 22 and 24 using the respective beam formers 32 and 34. The antenna system 10 is utilized to point electronically at angles in two-dimensional space with a fan beam (e.g., an orthogonal beam).

The antenna arrays 22 and 24 are each linear arrays in some embodiments. In some embodiments, the array 22 is disposed orthogonally with respect to the array 24. In some embodiments, the linear arrays 2 and 24 are orthogonal and intersect in a co-center phase center coincident layout or have phase centers offset from each other. In some embodiments, the array 22 is disposed vertically, and the array 24 is disposed horizontally. The cross shape of the arrays 22 and 24 can be rotated in its mounting to drive the low side lobe regions to a specific angular sector of interest (e.g., the crossed linear array dipole arms do not have to be horizontal and vertical relative to absolute Earth coordinates) in some embodiments.

In some embodiments, the antenna arrays 22 and 24 include elements of various shapes including but not limited to: a square, prism shaped, rectangular, hexagonal, pentagonal, circular, cylindrical, spherical, etc. and are flat or an arbitrarily curved surface conformal to a vehicle surface, etc. In some embodiments, the antenna system 10 is configured so that the arrays 22 and 24 are crossed orthogonal linear arrays driven independently or in synchronism to realize a very wide field of view interrogation or transmission, within a minimal scan time interval, due to the fan beam nature of the arrays 22 and 24. The antenna system 10 is configured to provide a crossed linear array that has a much narrower beam width, with similar aperture effectivity, to that of a conventional two-dimensional, one-half wavelength spaced array of the same element count.

The number of the antenna elements in the arrays 22 and 24 can vary according to design criteria and system parameters. The antenna elements can be tightly coupled dipole arrays (TCDA) and can be slot antennas (e.g., metal cutouts) or other structures. The number, size, polarization, and shape of the antenna elements vary according to design parameters and system criteria. In some embodiments, the polarization of the radiating element can be adjusted, either through a static mount, or dynamically through electronic adjustment.

The polarization of the radiating elements of the crossed linear array (e.g., the array 22 and 24) have a horizontal polarization (HP) characteristic, a vertical polarization (VP) characteristic, a circular polarization (CP) characteristic, an elliptical polarization (EP) characteristic, or an arbitrarily inclined linear polarization (LP) characteristic (e.g., static, or dynamically adjusted). In addition, and alternatively, the beam formers 32 and 34 can dedicate two channels per a dual orthogonal radiating element to process polarization.

The beam formers 32 and 34 are hybrid digital beam formers in some embodiments, and include various components including frequency synthesizers, oscillators, mixers, power amplifiers, low noise amplifiers, phase shifters, transmit/receive switches, temperature sensing equipment, radio frequency (RF) power and phase delay sensing components, splitters, summers, time delay units, and digital and analog control busses in some embodiments. The beam formers 32 and 34 provide radio frequency signals to the arrays 22 and 24 via signal lines 36 and 37. The beam formers 32 and 34 are coupled to the beam computer 38 via control busses or signal lines 46 and 48. The signal lines 36, 37, 46, and 48 can represent multiple signal lines or buses. The beam formers 32 and 34 are coupled to Z-fab filters at each HDBF channel input in some embodiments. The Z-fab filters are low loss, high power miniature filters that are small enough for integration into the array lattice for radiating element channel-level filtration. The Z-fab filters are provided an additive manufacturing process.

In some embodiments, the antenna system 10 (e.g., the beam formers 32 and 34) can employ multi-chip modules discussed in U.S. application Ser. No. 13/760,964 filed Feb. 6, 2013, now U.S. Pat. No. 8,907,817, Ser. No. 13/781,449, filed Feb. 28, 2013, now U.S. Pat. No. 9,116,244 and Ser. No. 13/837,934 filed Mar. 15, 2013, now U.S. Pat. No. 9,478,858, all of which are incorporated herein by reference in their entireties. In some embodiments, the antenna system 10 can include components described in U.S. application Ser. No. 13/714,209 filed Dec. 13, 2012, now U.S. Pat. No. 9,667,235, and Ser. No. 13/737,777 filed Jan. 9, 2013, now U.S. Pat. No. 8,903,342, both incorporated herein by reference in their entireties. In some embodiments, beam formers 32 and 34 perform hybrid digital beam forming operations and include analog-to-digital and digital-to-analog converters and digital processors for providing the digital beam forming instead of analog beam forming components in some embodiments. In some embodiments, the beam formers 32 and 34 are configured for operation at the RF (e.g., centered at the carrier frequency) or at an intermediate frequency (e.g., after a first down conversion).

The beam formers 32 and 34 include components described in U.S. application Ser. No. 14/300,074, now U.S. Pat. No. 9,653,820, filed by West et al. herewith, and entitled "Active Radio Frequency-Based Manifold System and Method," U.S. application Ser. No. 14/300,074, now U.S. Pat. No. 9,653,820, filed by West et al. herewith, and entitled "Active Manifold System and Method for an Array Antenna," and U.S. application Ser. No. 14/300,055, now U.S. Pat. No. 9,735,469, filed on by West et.al., and entitled "Integrated Time Delay Unit System and Method for a Feed Manifold,".

The beam formers 42 and 34 can be provided on one or more RF integrated circuits, or modules in one embodiment. The beam formers 42 and 34 can include a block up/down converter, an analog-to-digital converter/digital-to-analog converter circuit, and a processor. The beam formers 42 and 34 can be a receiver only, transmitter only, or both a transmitter/receiver. The beam formers 42 and 34 can be embodied as a hard-wired circuit, ASIC, programmable logic device, processor or combination thereof The beam computer 38 includes a software module in some embodiments. The beam computer 38 is a computer platform or processor, an ASIC, a programmable logic device, hardware circuitry, software or a mixture of thereof. In some embodiments, the beam computer 38 provides a set of phase or time delay commands on the signal lines 46 and 48 in response to a beam pointing angle parameter and a frequency parameter. In some embodiments, the set of the set of phase or time delay commands are provided in response to a beam pointing angle parameter, an environmental parameter, and a frequency parameter. In some embodiments, the beam computer 38 effects aperture amplitude and phase synthesis to improve base line performance of the crossed linear array (e.g., the arrays 22 and 24).

The beam computer 38 also selects the number of beams that may be activated by digital beam forming by the beam formers 32 and 34. The beam computer 38 is provided within ancillary equipment, antenna system 10 and/or as a discrete system. In some embodiments, the beams are coherently summed in the beam computer 38 and have a narrow bandwidth composite beam.

The phase shift or time delay commands can be can be provided by the beam computer 38 in accordance with the techniques described in U.S. application Ser. No. 14/300, 021, filed Jun. 19, 2014 and incorporated herein by reference in its entirely. A lookup table, or algorithm can be used to calculate the amount of time delay or phase shift at each level for implementing the time delay or phase shift at the arrays 22 and 24 In some embodiments, the processing for the beam forming commands and beamforming operations is performed by a single computer or by distributed processors.

The beams provided by the antenna system 10 are advantageously crossed orthogonal beams that are coherently summed and have a narrow bandwidth composite beam. The antenna system 10 advantageously utilizes the arrays 22 and 24 configured as two orthogonal linear rays and hybrid digital beam forming of the same polarization to synthetically produce an equivalent two-dimensional directional beam at a given center frequency and instantaneous bandwidth via digital signal processing techniques. The architecture using two linear arrays such as the arrays 22 and 24 reduces the channel count for the beam formers 32 and 34 by an order of magnitude. In some embodiments, the arrays 22 and 24 include guard elements to ensure ultra-wide band operations.

Table 1 below summarizes parameters for certain antenna systems. The antenna system 10 configured as the crossed linear array in Table I provides similar performance with far less power and hardware requirements than the two dimensional arrays listed and provides greater boresight gain, azimuth beam width, elevation beam width and peak side lobe than a single linear array in some embodiments. In the receive mode, the lower DC power required for the

TABLE 1

Performance of Array Architectures

| Parameter | Crossed Linear Array | Single Linear Array | 8 × 8, λ/2 spaced 2D Array | Fully Loaded 33 × 33, λ/2 spaced 2D Array |
|---|---|---|---|---|
| Boresight Gain | 23 dBi | 20 dBi | 25 dBi | 35 dBi |
| Az Beam Width | 4.5° | 3.0° | 13° | 3.0° |
| El Beam Width | 4.5° | 3.0° | 13° | 3.0° |
| Peak Side Lobe | 18 dBp | 12.5 dBp | 12.5 dBp | 12.5 dBp | crossed linear array of the antenna system 10 with 2*n element count is a significant advantage when compared to a fully loaded two-dimensional receive AESA of n*n element count. For example, 2*33 or 66 element count for the crossed linear array compared to a 33*33=1,089 element for a fully loaded two-dimensional receive AESA—has a decrease of 15 dB in electronic gain which is trivial relative to overall DC power consumption. Further, the additional components in the beamformers for the higher element count of the fully loaded two-dimensional AESA significantly increase cost, size, weight and difficulty of manufacture. In the transmit mode, the crossed linear array of the antenna system 10 has reduced effective isotropic radiated power (EIRP) relative to a fully loaded element for a fully loaded two dimensional transmit AESA, for the same power amplifier power per channel, but its directional sensitivity (beam width) is superior to a conventional two dimensional half wavelength spaced array of the same element count.

Figure 2:
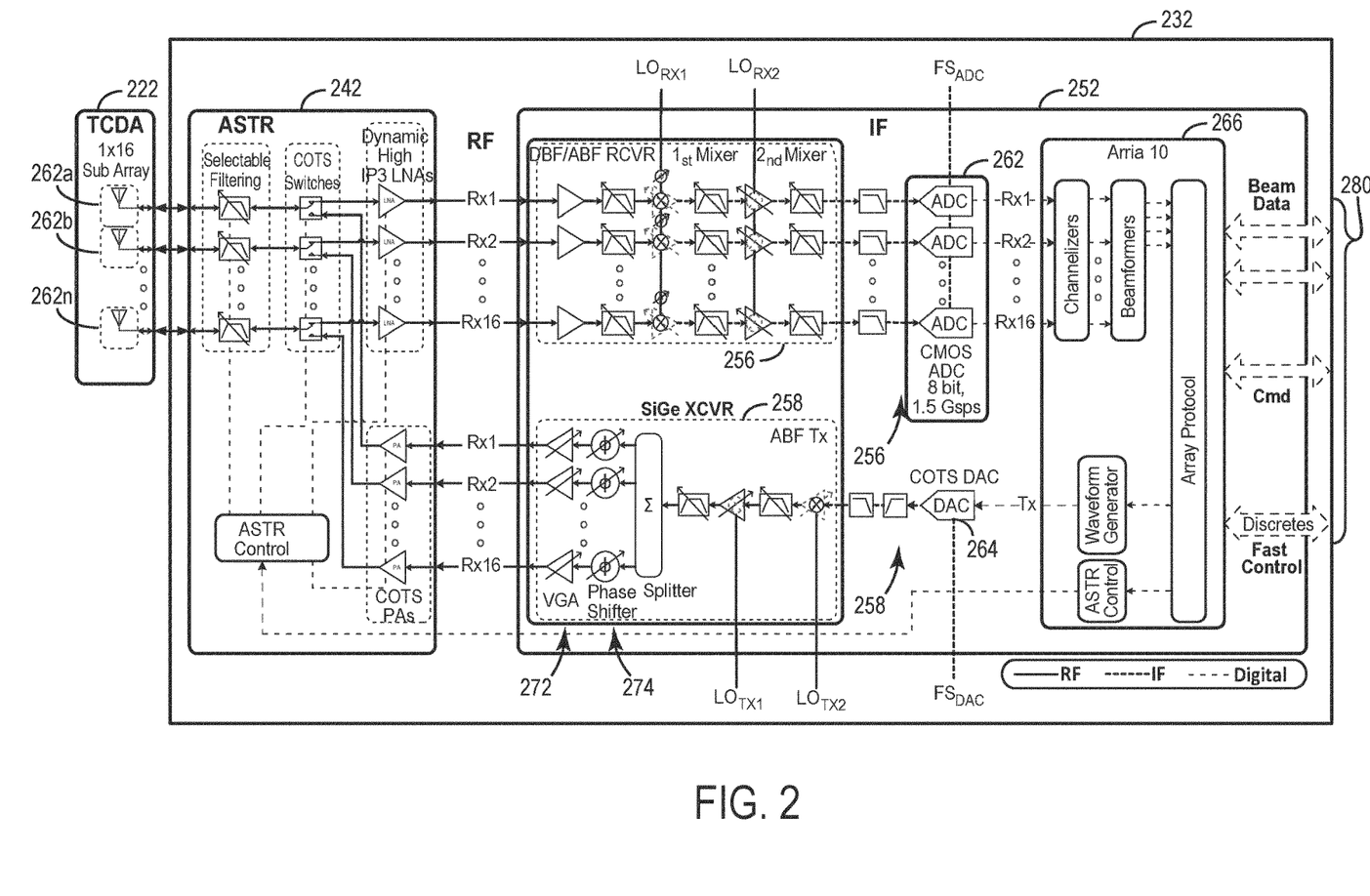
FIG. 2 is an electric schematic drawing of a linear antenna array coupled to a hybrid digital beam former for the antenna system illustrated in FIG. 1 according to exemplary aspects of the inventive concepts disclosed herein.

With reference to FIG. 2, an array 222 and a beam former 232 can be utilized as the array 22 and the beam former 32 or as the array 24 and the beam former 34 in FIG. 1 according to some embodiments. The array 222 is a linear array similar to the arrays 22 and 24 and includes N antenna elements 262a-n, where N is an integer (e.g., 16). The array 222 includes a linear array of the antenna elements 262a-n. The antenna elements 262a-n can be various types of elements such as circuit board elements or metal cutouts, slot antennas, etc. In some embodiments, the array 222 is a tightly coupled array which can be a sub-array to be used with other sub-arrays. The array 222 is coupled to the beam former 232 which is similar to the beam formers 32 and 34.

In some embodiments, the beam former 232 includes an ASTRM 242 and a beam forming module 252. The ASTRM 242 provides selective transmit and receive interfacing, selective filtering, switching a low noise amplification, and power amplification in some embodiments.

The beam forming module 252 includes inputs and outputs coupled to the beam computer 38 (FIG. 1) at a beam computer interface 280 for receiving and providing signals received and transmitted on the array 222. The beam forming module 252 includes a super heterodyne circuitry for providing a common intermediate frequency for digital beam forming and analog to digital conversion. The architecture of the beam forming module 252 incorporates tunable IF filters featuring large center frequency tuning bandwidth with a commensurate modest instantaneous bandwidth. All beams of the beam forming module 252 are restricted to the same center frequency and instantaneous bandwidth since they are derived from a common IF frequency bandwidth in some embodiments. In some embodiments, the beam forming module 252 is configured for direct digital beam forming where the RF carrier signal is directly sampled as I and Q components under the Nyquist criteria.

The beam forming module 252 includes receive paths 256, transit paths 258, analog-to-digital converters 262, a digital-to-analog converter 264 and a processor 266 in some embodiments. The beam forming module 252 provides analog and/or digital beam forming for the receive paths 256 and analog beam forming for the transmit paths 258 in some embodiments. IF mixing and filtering is performed in the receive paths 256 and the transmit paths in some embodiments. The analog-to-digital converters 262are coupled to the receive paths 256, and the digital to analog converter is coupled 264 to the transmit paths 258.

The processor 266 performs channelization and digital beam forming for the receive paths 256 and waveform generation for the transmit paths 258. The transmit paths 258 include variable gain amplifiers 272 and phase shifters 274 for effecting analog beam forming. The processor 266 responds to beam commands from the interface 280. In some embodiments, the processor 266 follows an array protocol to provide a digitally beam formed intersecting fan beam.

Figure 3:
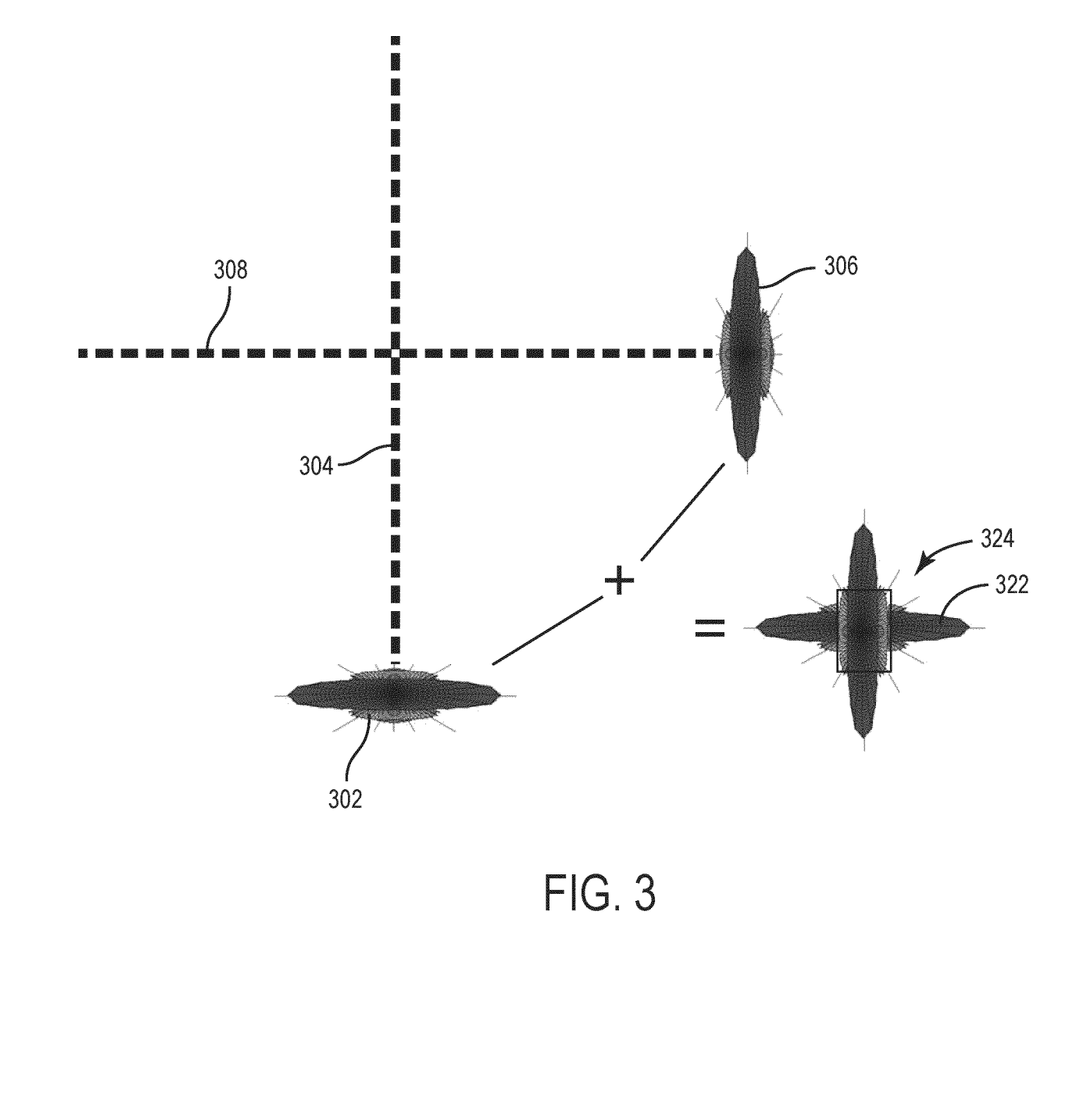
FIG. 3 is a schematic representation of independent fan beams for the antenna system illustrated in FIG. 1 according to exemplary aspects of the inventive concepts disclosed herein.

With reference to FIG. 3, a simulated response 322 for the antenna system 10 (FIG. 1) embodied as linear arrays that are polarization matched is a combination of a response 302 and a response 306. Darker portions are indicative of more energy in FIG. 3. The response 302 is for a vertical array 304 and the response 306 is for a vertical array 308 which are combined as two independent fan beams having the response 322. The array 304 is similar to the array 22 (FIG. 1) and the array 308 is similar to the array 24 (FIG. 1) in some embodiments. Coherent processing of the two independent fan beams (e.g., by the processor 266 (FIG. 2) synthesizes a higher gain and narrow beam with composite beam as represented by response 322. The higher gain, narrow beamwidth composite beam is represented by a box 324.

Figure 5:
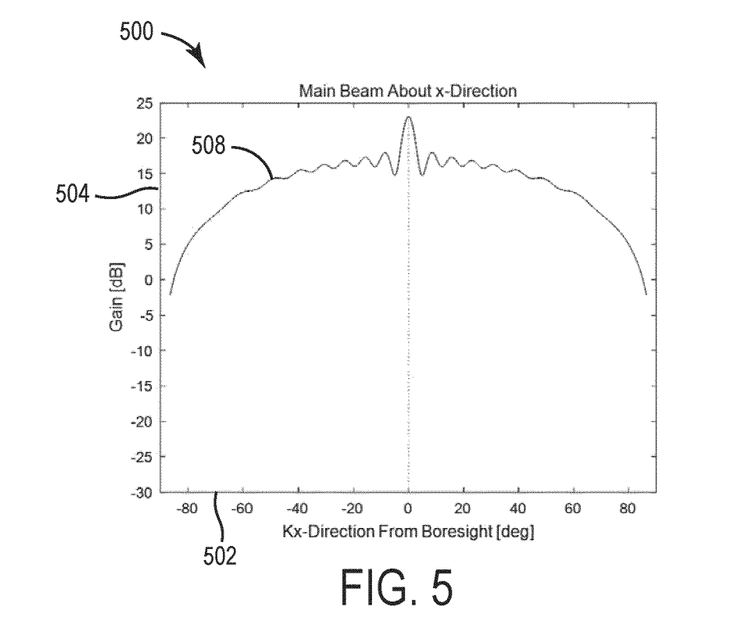
FIG. 5 is a graph showing the gain of a main beam provided by the antenna system illustrated in FIG. 1 about an X-axis direction according to exemplary aspects of the inventive concepts disclosed herein.
Figure 6:
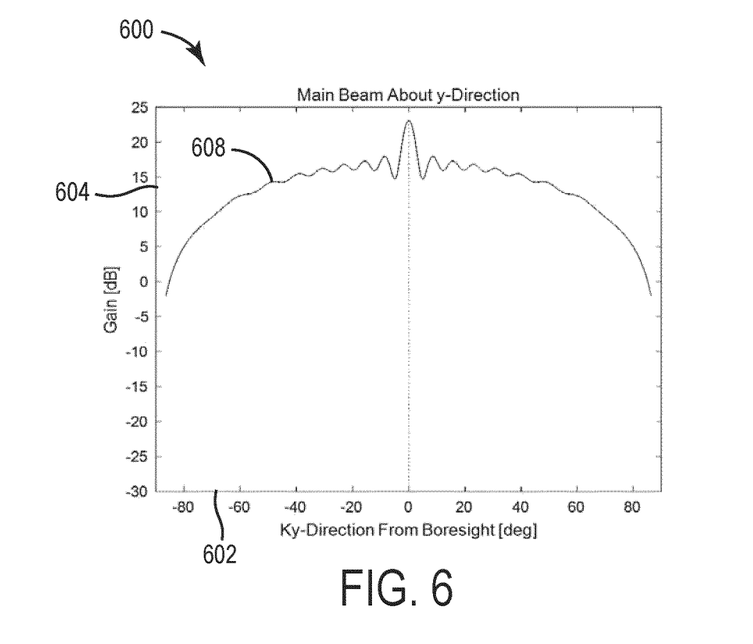
FIG. 6 is a graph showing the gain of a main beam provided by the antenna system illustrated in FIG. 1 about a Y-axis direction according to exemplary aspects of the inventive concepts disclosed herein.

FIGS. 4-6 are topographical plots of 3D radiation pattern in (u,v), or k-space coordinate system, which is used in the mathematics of phased array theory. The conversion between (u,v) space and spherical coordinates and (azimuth, elevation) are well known in the literature and are not described herein. A kx range of (−1 to +1) essentially means an angle range from (−90 to +90) degrees (i.e., horizon to horizon) if the linear arrays are in the (x,y) plane with radiation travelling in the +z direction of a spherical coordinate system. Similarly ky (−1 to +1) corresponds to (−90 to +90). With reference to FIG. 4A, a graph 400 showing a simulated response 406 for the antenna system 10 includes an X-axis 402 showing spatial position from −1 to 1 and a Y-axis 404 from 1 to −1. The beam (e.g., the dual fan beam) is pointed at an azimuth angle of 0 degrees and an elevation angle of 0 degrees for the response 406. The intensity of the response 406 is represented by according to a scale 412.

Figure 4A:
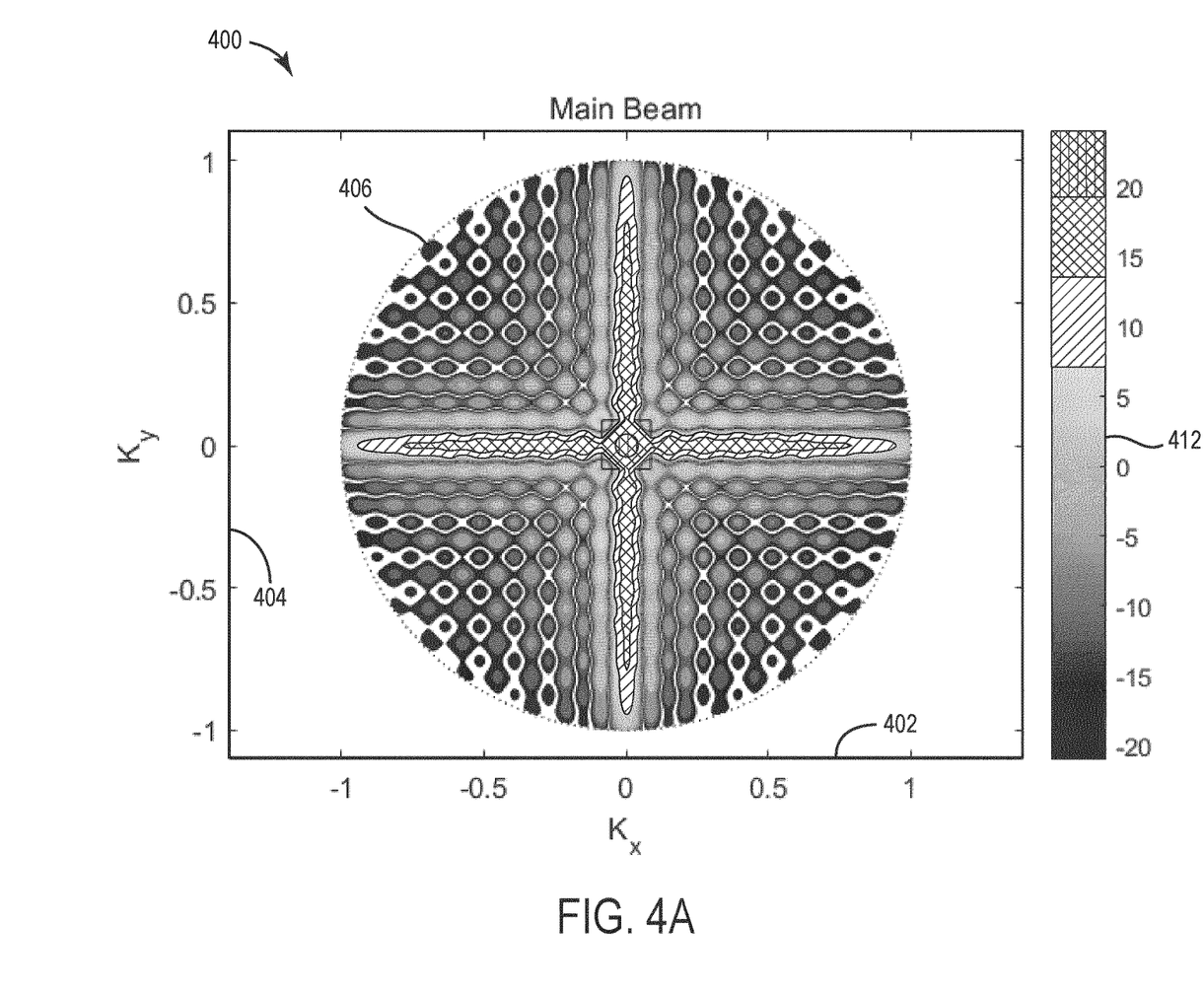
FIG. 4A is a graph showing the response of the antenna system illustrated in FIG. 1 pointing at an azimuth angle of 0 degrees and an elevation angle of 0 degrees according to exemplary aspects of the inventive concepts disclosed herein.
Figure 4B:
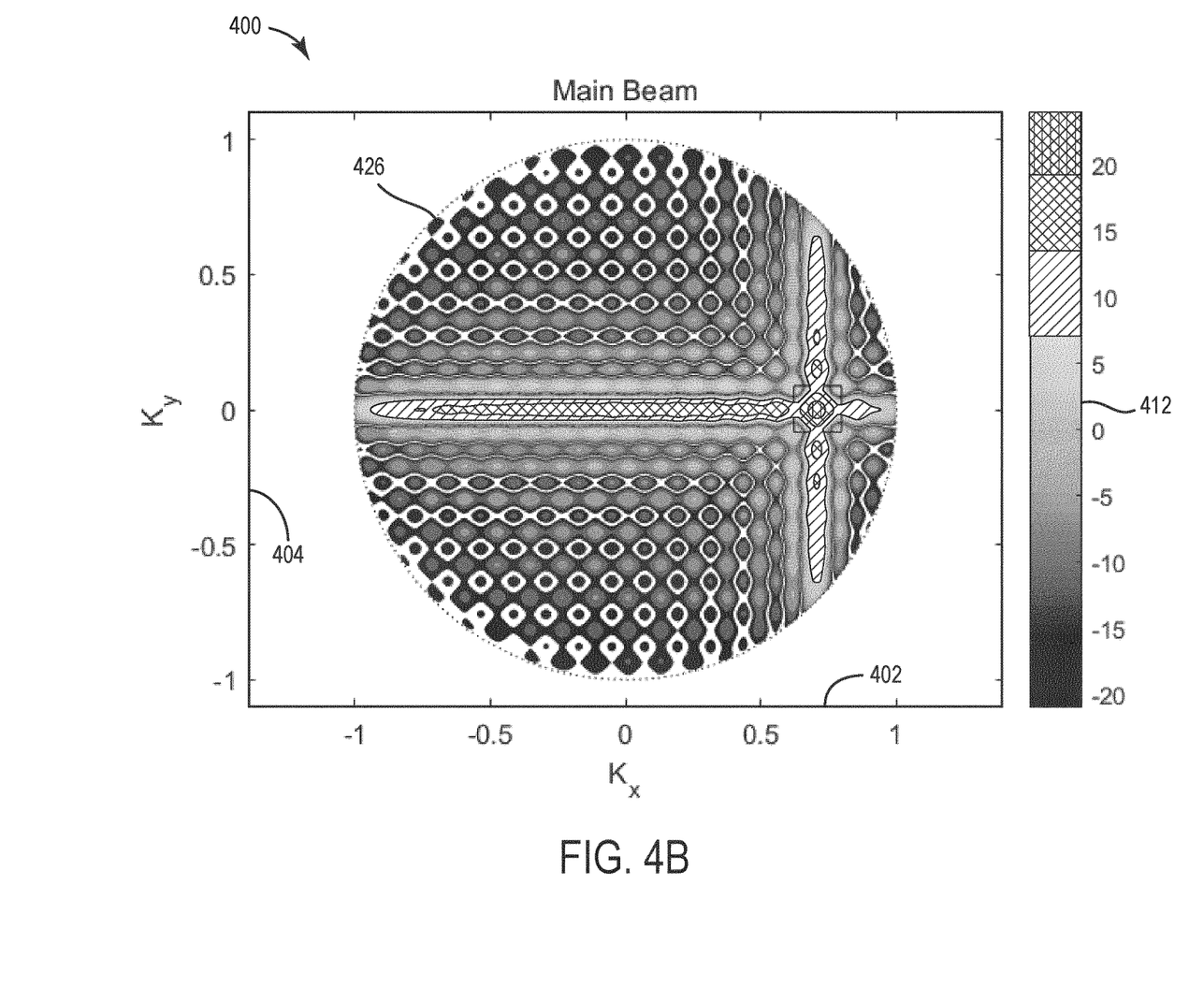
FIG. 4B is a graph showing the response of the antenna system illustrated in FIG. 1 pointing at an azimuth angle of 45 degrees and an elevation angle of 0 degrees according to exemplary aspects of the inventive concepts disclosed herein.

With reference to FIG. 4B, the graph 400 showing a simulated response 426 for the antenna system 10 includes the X-axis 402 showing spatial position from −1 to 1 and the Y-axis 404 from 1 to −1. The beam (e.g., the dual fan beam) is pointed at an azimuth angle of 45 degrees and an elevation angle of 0 degrees for the response 426. The intensity of the response 426 is represented by according to the scale 412.

Figure 4C:
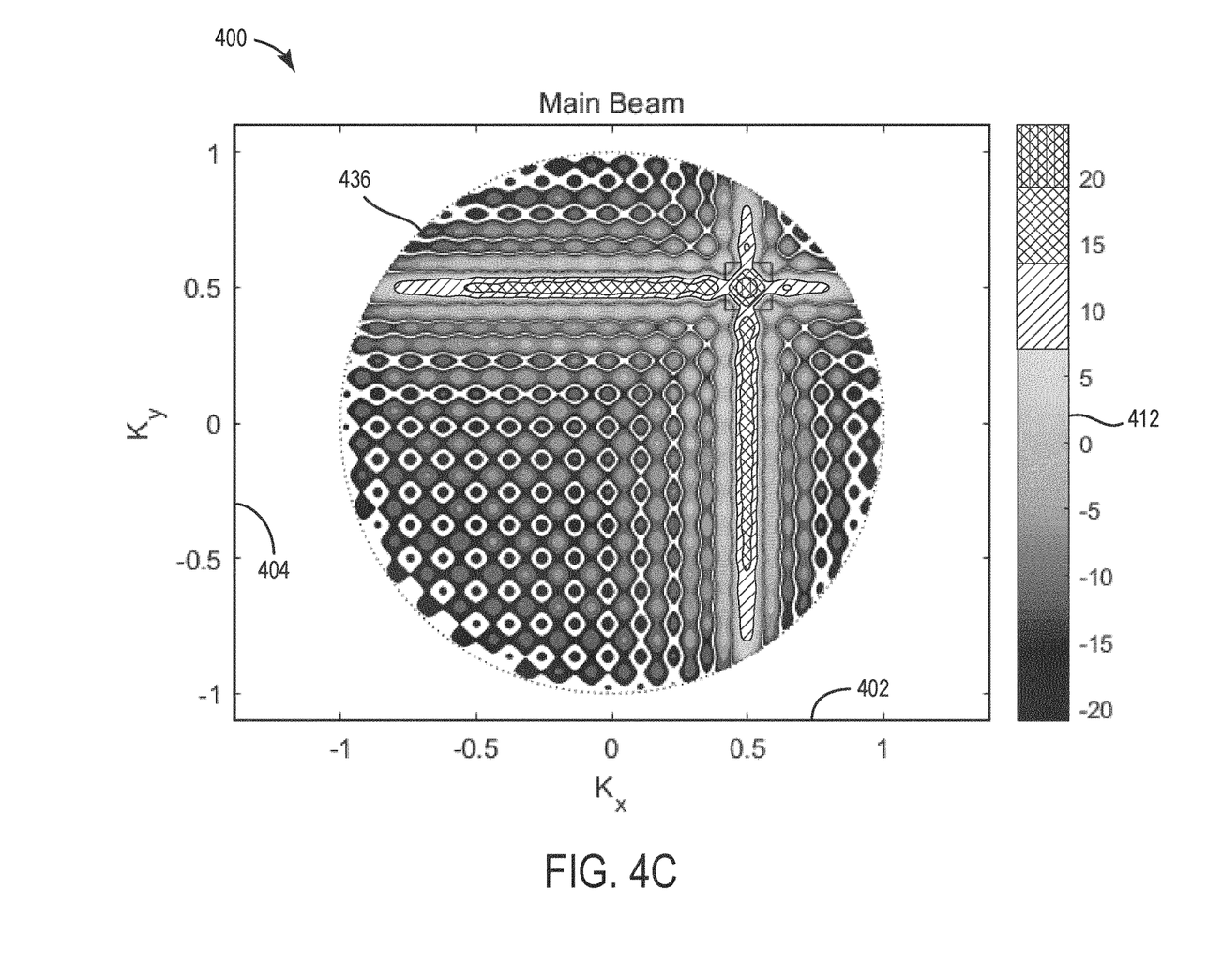
FIG. 4C is a graph showing the response of the antenna system illustrated in FIG. 1 pointing at an azimuth angle of 45 degrees and an elevation angle of 45 degrees according to exemplary aspects of the inventive concepts disclosed herein.

With reference to FIG. 4C, the graph 400 showing a simulated response 436 for the antenna system 10 includes an X-axis 402 showing spatial position from −1 to 1 and a Y-axis 404 from 1 to −1. The beam (e.g., the dual fan beam) is pointed at an azimuth angle of 0 degrees and an elevation angle of 45 degrees for the response 436. The intensity of the response 436 is represented by according to the scale 412.

Figure 4D:
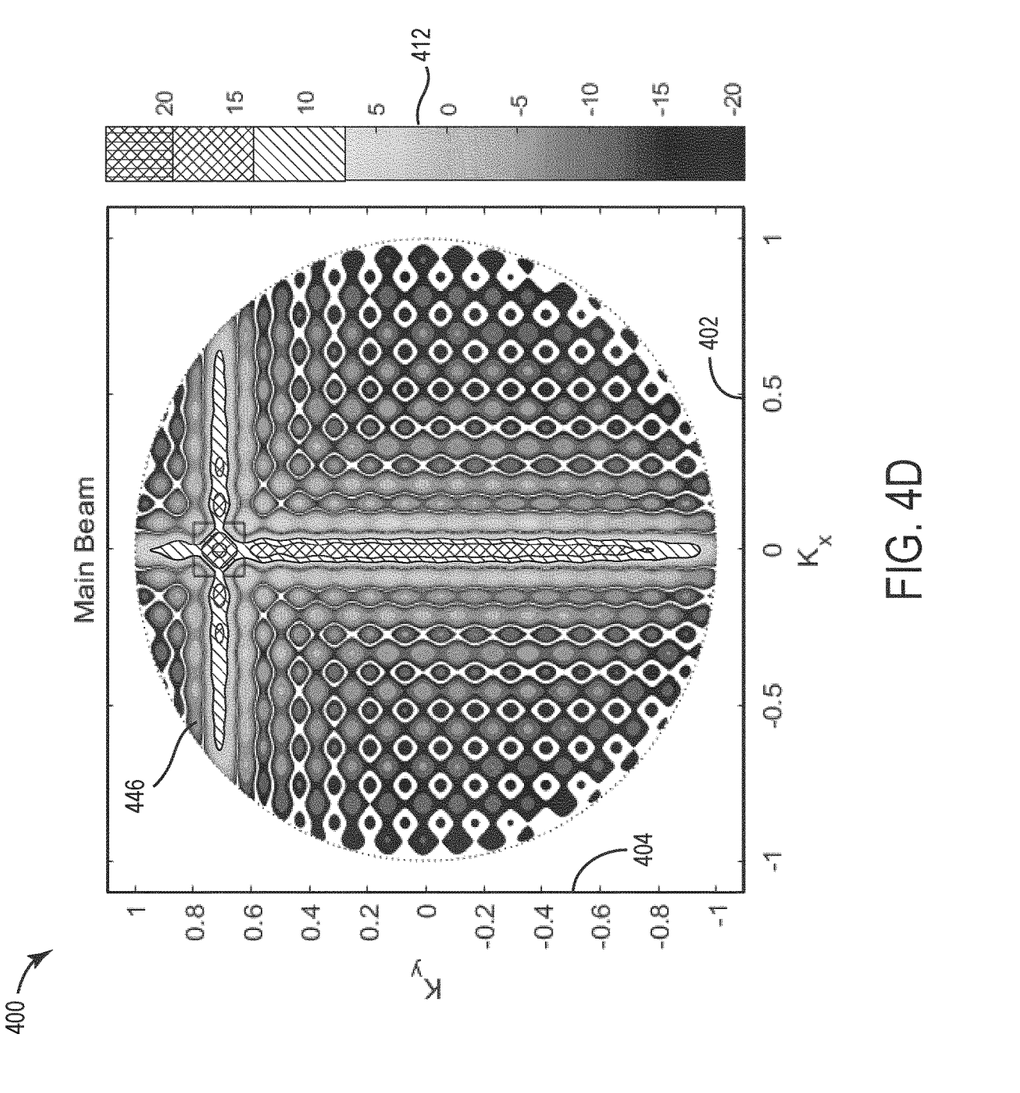
FIG. 4D is a graph showing the response of the antenna system illustrated in FIG. 1 pointing at an azimuth angle of 90 degrees and an elevation angle of 45 degrees according to exemplary aspects of the inventive concepts disclosed herein.

With reference to FIG. 4D, the graph 400 showing a simulated response 446 for the antenna system 10 includes the X-axis 402 showing spatial position from −1 to 1 and the Y-axis 404 from 1 to −1. The beam (e.g., the dual fan beam) is pointed at an azimuth angle of 90 degrees and an elevation angle of 45 degrees for the response 446. The intensity of the response 446 is represented by according to the scale 412.

In some embodiments, the responses 406, 426, 436, and 446 are for an antenna system 10 with a 66 element crossed linear array. The antenna system 10 with a 66 element crossed linear array provides three times beam sharpening relative to a conventional two dimensional one half wavelength spaced array of approximately the same element count (8*8=64). The responses 406, 426, 436, and 446 indicate that the crossed linear array advantageously is grating lobe free for two dimensional scanning as a function of azimuth and elevation. In some embodiments, the inter-cardinal plane side lobes are relatively low (i. e., the cut planes that are off axis with respect to those that are coincident with the arms of the crossed linear array.

With reference to FIG. 5, a graph 500 includes an X-axis 502 representing the Kx direction from the boresight in degrees and a Y-axis 504 representing gain in decibels. A curve 508 represents a simulated response of the main beam produced by the antenna system 10 (FIG. 1) about the x direction in some embodiments.

With reference to FIG. 6, a graph 600 includes an X-axis 602 representing the Ky direction from the boresight in degrees and a Y-axis 604 representing gain in decibels. A curve 608 represents a simulated response of the main beam produced by the antenna system (FIG. 1) about a y direction in some embodiments. The curves 508 and 608 are for the simple case of each of the linear arrays 222 and 24 in an orthogonal orientation having uniform element excitation. Antenna pattern synthesis techniques can be applied to lower side lobe levels, adjust beam widths, create nulls, etc.

Figure 7:
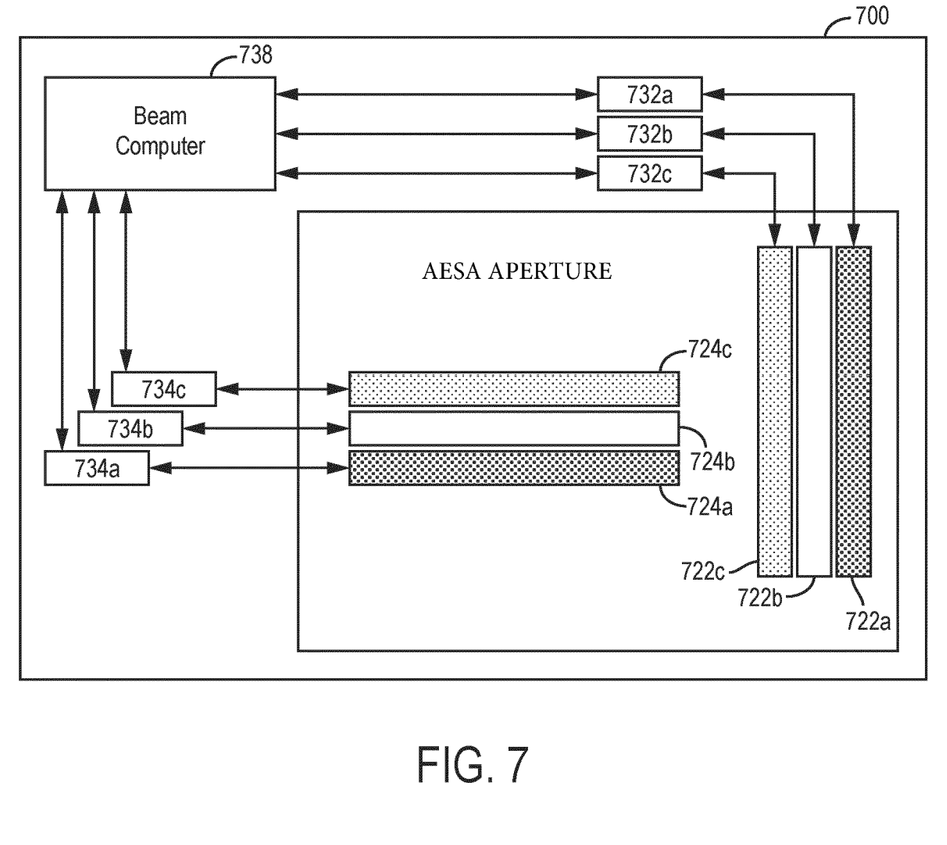
FIG. 7 is a general block diagram of an antenna system with six linear arrays configured for operation at three different frequencies according to exemplary aspects of the inventive concepts disclosed herein.

With reference to FIG. 7, an antenna system 700 includes a beam computer 738 similar to beam computer 38 (FIG. 1), a set of beam formers 732a-c and 734a-c, and a set of antenna arrays 724a-c and 722a-c. Beam formers 732a-c are similar to the beam former 32 (FIG. 1), and beam formers 734a-c are similar to the beam former 34 (FIG. 1). The arrays 722a-c are similar to array 22, and arrays 724a-c are similar to array 24 (FIG. 1). Each of the arrays 722a-c and corresponding beam formers 732a-c is configured for a particular frequency arrange. Similarly, each of the arrays 724a-c and beam formers 734a-c is configured the same frequency ranges. Each of the arrays 724a-c and 724a-c can correspond to a sub-array. In some embodiments, the arrays 722a and 724a are C-band arrays, the arrays 722b and 724b are S-band arrays and the arrays 722c and 724c are X-band arrays; each of the pairs is arranged orthogonal to each other. The multiple orthogonal array concept can be expanded beyond three (e.g., linear array sets of 4, 5, 6, etc., each for a different bandwidth) in some embodiments.

The linear arrays 22 and 24 and 722a-c and 724a-c are depicted in the FIGS. 1 and 7 as being physically offset from each other. The linear arrays 22 and 24 and 722a-c and 724a-c may not have the same electrical phase center which is suitable for some applications. In other applications the same electrical phase center is preferred or required, and the linear arrays 22 and 24 and 722a-c and 724a-c are physically disposed to have the same phase center or are re-aligned to have a common phase center by time delay digital signal processing through FIR filter implementations in some embodiments. Phase center realignment concepts are discussed in the U.S. patent application Ser. No. 16/146,349, entitled "Element Level Polarization Synthesis Network For Electronically Scanned Arrays" (47141-1414), filed by West et al. on an even date herewith incorporated herein by reference in its entirety. In some embodiments, instead of using analog polarization synthesis network/phase center alignment circuits, the polarization synthesis network/phase center alignment is implemented through digital signal delay processing.

It will be appreciated that the various ESAs described herein, including the antenna system 10, may include varying arrangements of antennas. In some embodiments, the subarrays of antennas are provided to form a three-dimensional array, which can be made conformal to a three-dimensional surface, such as a surface of an airborne platform. The number of antenna elements can vary according to design criteria and system The construction and arrangement of the systems and methods as shown in the various exemplary embodiments are illustrative only. Other numbers or types of antenna elements, other polarization configurations and other numbers or types of dipole elements can be used. Although only a number of embodiments have been described in detail in this disclosure, many modifications are possible (e.g., variations in sizes, dimensions, structures, shapes and proportions of the various elements, values of parameters, orientations, etc.). For example, the position of elements may be reversed, flipped, or otherwise varied and the nature or number of discrete elements or positions may be altered or varied. Accordingly, all such modifications are included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the scope of the inventive concepts disclosed herein.

What is claimed is:

1. An antenna system for an intersecting fan beam, comprising:
    a first linear array;
    a second linear array, the first linear array being orthogonal to the second linear array and having the same polarization characteristic of the second linear array;
    a first beam former coupled to the first linear array;
    a second beam former coupled to the second linear array; and
    a processor configured to effect the intersecting fan beam using the first linear array and the second linear array, wherein coherent processing of a first fan beam from the first linear array and a second fan beam from the second linear array synthesizes a higher gain with smaller beam width composite beam as the intersecting fan beam.

2. The system of claim 1, wherein the intersecting fan beam is associated with a coherent summing operation.

3. The system of claim 1, wherein the first linear array and the second linear array are polarization matched.

4. The system of claim 1, wherein the first linear array and the second linear array are grating lobe free for two dimensional scanning a function of azimuth and elevation.

5. The system of claim 1, wherein the first linear array and the second linear array are printed circuit elements on a printed circuit board.

6. An antenna system for an intersecting fan beam, comprising:
    a first linear array;
    a second linear array, the first linear array being orthogonal to the second linear array and having the same polarization characteristic of the second linear array;
    a first beam former coupled to the first linear array;
    a second beam former coupled to the second linear array; and
    a processor configured to effect the intersecting fan beam using the first linear array and the second linear array, wherein the intersecting fan beam is associated with a coherent summing operation, wherein the first beam former is configured to perform digital beam forming in a receive path and analog beam forming in the transmit path.

7. The system of claim 6, wherein coherent processing of a first fan beam from the first linear array and a second fan beam from the second linear array synthesizes a higher gain with smaller beam width composite beam as the intersecting fan beam.

8. The system of claim 7, wherein the first linear array comprises first elements disposed in a vertical line and the second linear array comprises second elements disposed in a horizontal line.

9. The system of claim 7, wherein the first linear array comprises first elements disposed in a vertical line and the second linear array comprises second elements disposed in a horizontal line wherein the first elements and the second elements are circuit board conductors and have offset phase centers, wherein at least one of the first beam former or the second beam former performs phase center alignment through digital signal delay processing.

10. The system of claim 1, wherein the first linear array comprises first elements disposed in a vertical line and the second linear array comprises second elements disposed in a horizontal line.

11. The system of claim 6, wherein the first linear array and the second linear array are polarization matched.

12. The system of claim 6, wherein coherent processing of a first fan beam from the first linear array and a second fan beam from the second linear array synthesizes a higher gain with smaller beam width composite beam as the intersecting fan beam.

13. The system of claim 6, wherein the antenna system is utilized with a receiver, transceiver or transmitter having a frequency range between 15 gigahertz and 60 gigahertz.

14. The system of claim 6, wherein the first linear array and the second linear array are grating lobe free for two dimensional scanning a function of azimuth and elevation.

15. An antenna system for an intersecting fan beam, comprising:
 a first linear array;
 a second linear array, the first linear array being orthogonal to the second linear array and having the same polarization characteristic of the second linear array;
 a first beam former coupled to the first linear array;
 a second beam former coupled to the second linear array; and
 a processor configured to effect the intersecting fan beam using the first linear array and the second linear array, wherein the first linear array comprises first elements disposed in a vertical line and the second linear array comprises second elements disposed in a horizontal line wherein the first elements and the second elements are circuit board conductors and have offset phase centers, wherein at least one of the first beam former or the second beam former performs phase center alignment through digital signal delay processing.

16. The system of claim 15, wherein the intersecting fan beam is associated with a coherent summing operation.

17. The system of claim 15, wherein the intersecting fan beam is associated with a coherent summing operation, wherein the first beam former is configured to perform digital beam forming in a receive path and analog beam forming in a transmit path.

18. An antenna system for an intersecting fan beam, comprising:
 a first linear array;
 a second linear array, the first linear array being orthogonal to the second linear array and having the same polarization characteristic of the second linear array;
 a first beam former coupled to the first linear array;
 a second beam former coupled to the second linear array;
 a third linear array;
 a fourth linear array, the fourth linear array being orthogonal to the third linear array;
 a fifth linear array;
 a sixth linear array, the fifth linear array being orthogonal to the sixth linear array;
 a third beam former coupled to the third linear array;
 a fourth beam former coupled to the fourth linear array;
 a fifth beam former coupled to the fifth linear array;
 a sixth beam former coupled to the sixth linear array; and
 a processor configured to effect the intersecting fan beam using the first linear array and the second linear array.

19. The system of claim 18, wherein the first linear array and the second linear array are configured for a first frequency range, the third linear array and the fourth linear array are configured for a second frequency range, and the fifth linear array and the sixth linear array are configured for a third frequency range.

20. The system of claim 18, wherein the intersecting fan beam is associated with a coherent summing operation.

21. An antenna system for a digitally beam formed intersecting fan beam, the antenna system comprising:
 a beam steering computer;
 a first array;
 a second array, the first array being orthogonal to the second array;
 a first beam former coupled to the first array and the beam steering computer; and
 a second beam former coupled to the second array and the beam steering computer, wherein the beam steering computer coherently combines data from the first beam former and the second beam former for formation of the digitally beam formed intersecting fan beam.

22. The system of claim 21, wherein the antenna system is utilized with a receiver, transceiver or transmitter having a frequency range between 15 gigahertz and 60 gigahertz.

23. The system of claim 22, wherein the first array is provided on a first subpanel and the second array is provided on a second subpanel.

24. The system of claim 21, wherein the first array and the second array are grating lobe free for two dimensional scanning a function of azimuth and elevation.

25. The system of claim 21, wherein the first array is driven independently form the second array.

* * * * *